(12) United States Patent
Lee et al.

(10) Patent No.: US 8,544,625 B2
(45) Date of Patent: Oct. 1, 2013

(54) OVERRUNNING BI-DIRECTIONAL CLUTCH AS GEAR SYNCHRONIZER AND COUPLER

(75) Inventors: Brian Lee, York, SC (US); Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/271,114

(22) Filed: Oct. 11, 2011

(65) Prior Publication Data

US 2012/0043174 A1 Feb. 23, 2012

Related U.S. Application Data (63) Continuation of application No. 11/924,030, filed on Oct. 25, 2007, now abandoned.

(60) Provisional application No. 60/876,651, filed on Dec. 22, 2006, provisional application No. 60/871,664, filed on Dec. 22, 2006, provisional application No. 60/854,528, filed on Oct. 26, 2006.

(51) Int. Cl.
*F16D 41/08* (2006.01)

(52) U.S. Cl.
USPC ............................................. 192/38; 192/78

(58) Field of Classification Search
USPC ................ 192/38, 44, 77, 78; 74/337.5, 372
See application file for complete search history.

(56) References Cited

U.S. PATENT DOCUMENTS

| | | | | |
|---|---|---|---|---|
| 2,259,473 A * | 10/1941 | Johnson | | 192/44 |
| 3,393,783 A * | 7/1968 | Theyleg | | 192/78 |
| 4,987,790 A * | 1/1991 | Weismann | | 74/333 |
| 6,409,001 B1 | 6/2002 | Kerr | | |
| 6,557,680 B2 * | 5/2003 | Williams | | 192/27 |
| 6,652,407 B2 * | 11/2003 | Ronk et al. | | 475/204 |
| 6,974,400 B2 | 12/2005 | Williams | | |
| 6,997,296 B2 | 2/2006 | Hu et al. | | |
| 7,037,200 B2 * | 5/2006 | Dorrie et al. | | 464/35 |
| 7,779,978 B2 | 8/2010 | Joki | | |
| 7,874,414 B2 * | 1/2011 | Lee | | 192/38 |
| 7,997,159 B2 * | 8/2011 | Hemphill et al. | | 74/339 |
| 8,042,668 B2 * | 10/2011 | Lee | | 192/38 |
| 2006/0150760 A1 * | 7/2006 | Maguire et al. | | 74/331 |
| 2007/0029152 A1 | 2/2007 | Joki | | |
| 2008/0098843 A1 | 5/2008 | Hemphill et al. | | |

FOREIGN PATENT DOCUMENTS

WO WO 2005068867 A2 * 7/2005

* cited by examiner

*Primary Examiner* — David D Le
*Assistant Examiner* — Terry Chau
(74) *Attorney, Agent, or Firm* — Kevin L. Parks (57) ABSTRACT

The over-running bi-directional clutch is used to synchronize gears in a transmission to allow for locking and unlocking the gears in an efficient manner.

6 Claims, 8 Drawing Sheets

Fig. 13 free locked

OVERRUNNING BI-DIRECTIONAL CLUTCH AS GEAR SYNCHRONIZER AND COUPLER

BACKGROUND OF THE INVENTION

The invention concerns an over-running bi-directional clutch (ORBDC) used as a gear synchronizer, or coupler or any applications between a relatively moveable internal shaft, or the like, and an external shaft, gear, or other couplable element that is external to the ORBDC.

Applicant proposes use of the ORBDC hereof during a power shift in transmissions of the automated manual type or in active or passive transfers in four wheel drive or all wheel drive vehicle applications.

ORBDCs in general and the ORBDC hereof in particular are distinguishable from traditional manual transmissions and transfer case systems which utilize synchronizer components (forks, rings, cones, dog teeth, etc.) to match gear input/output speeds during gear selection and shifting, and to lock the selected gear for power transfer. These components are expensive, heavy, and large. Therefore traditional systems are relatively more expensive, more massive, and require larger packaging volume than the proposed solution ORBDC of the present invention. The invention therefore reduces system package size and mass as compared with traditional synchronizer component systems.

ORBDC is a known construction and examples of it appear U.S. Pat. Nos. 6,409,001; 6,997,296; and 6,974,400. It provides two operational modes in its position in a typical application, e.g., inside a speed gear and fixed to a power transmission shaft: 1) as an over-running plain bearing for gear rotation when the clutch is unblocked, and 2) as a rigid coupling for transfer of torque from the gear to the shaft, or vice versa, when the clutch is blocked. Both functions are effective bi-directional, i.e. performed during either clockwise or counterclockwise rotation.

BACKGROUND OF ORBDC AND ITS USE

Figure 1:
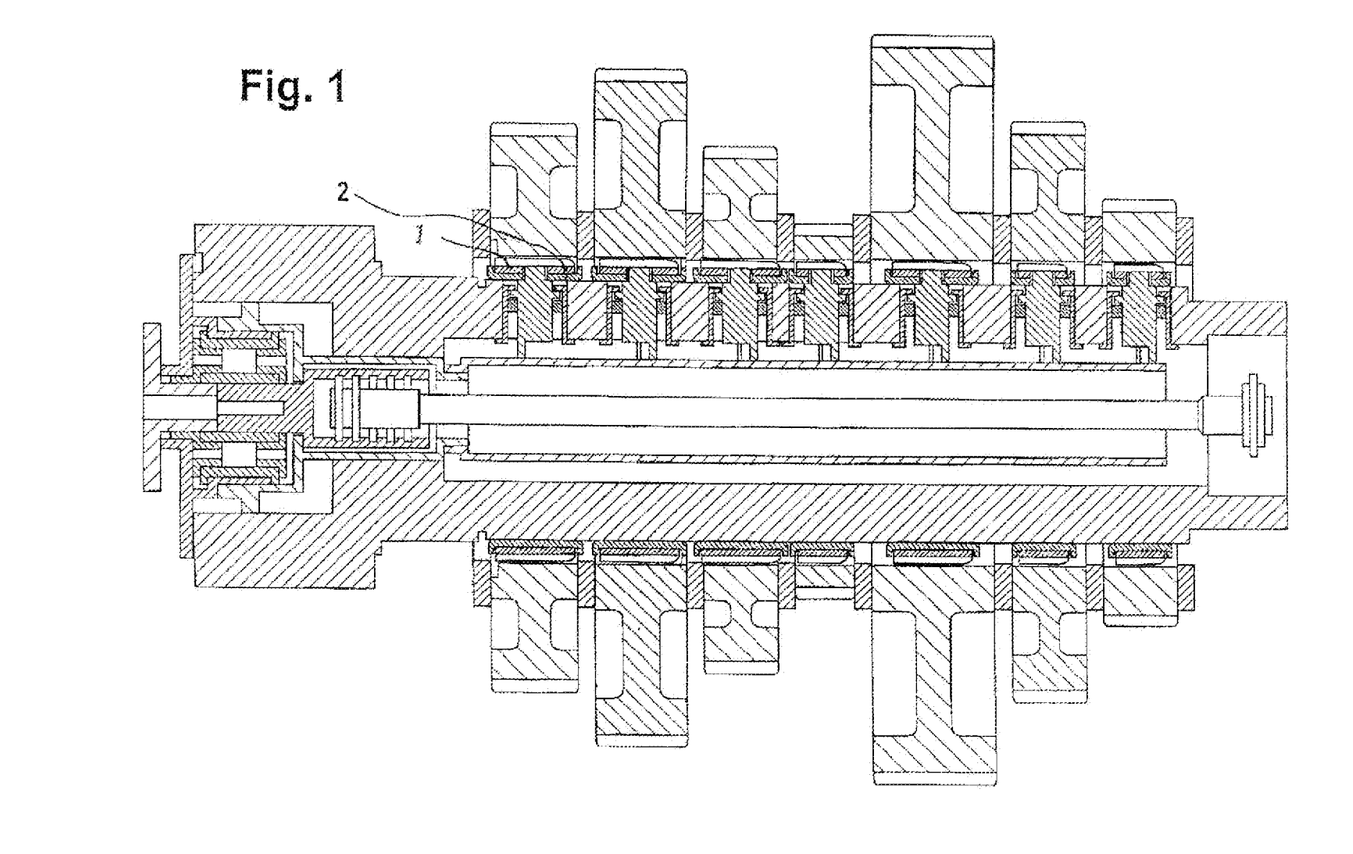
FIG. 1 illustrates a power transmission system in which the present invention is embodied.
Figure 2:
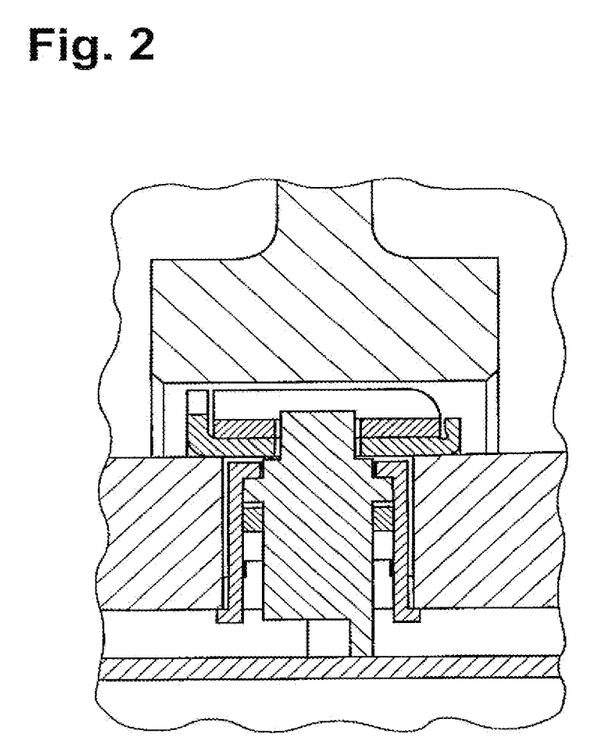
FIG. 2 is a detail of one ORBDC from FIG. 1.

Referring to FIG. 1, the ORBDC is basically comprised of three component sets. There is a drawn outer shell 1 of bearing quality steel, which is split to allow expansion of the outer diameter of the shell and the ORBDC. Ramped surfaces are formed on the inner diameter or surface of the outer shell.

There is a drawn inner shell 2 of bearing quality steel with a solid inner diameter for being press-fit onto a shaft. The inner shell has ramped surfaces on the outer diameter or surface thereof. The ramps on the outer shell as well on the inner shell are produced by forming axial direction depressions or grooves in one or both of the shell surfaces in which the below described needles or rollers sit and the inclined walls of those depressions or grooves define the ramps on which the needles or rollers move during operation described below.

A plurality of needles or bearing rollers 3 are disposed between the inner and outer shells and are received in the axial direction grooves or recesses formed by the ramped surfaces of each shell. The diameter of the needles or rollers allows them to move into the grooves or recesses. The recesses or grooves in the ramped surfaces of the inner and outer shells are shaped and disposed so that in a neutral position, the inner and outer shell depressions or grooves may be radially aligned.

When the ORBDC is in its "neutral" position, that is, no tangential rotational loads are applied to the outer shell, the ramps in the outer and inner shell align, forming grooves or pockets which loosely contain the needles or rollers. The outer shell in this position is in its unstressed, un-deformed state, which is at its smallest outer diameter. Thus the ORBDC functions as an over-running plain bearing and its state is unblocked.

When a relative tangential load is applied to the outer shell, it forces the outer shell to shift rotationally relative to the inner shell, thus misaligning the grooves in each shell. This motion causes the needles 3 to shift in their grooves or pockets into an interference condition with the shells. As the load builds, the needles are forced against the ramped surfaces and begin to "ride the ramps" toward the outer diameter of the assembly. This transfer of load from tangential to radial, and the split in the outer shell, allows the outer shell's effective diameter to increase. As the diameter increases, the clearance between the ORBDC and the speed gear around it is reduced until the gap between them is eliminated. The gear is then locked to the clutch via friction. If the ORBDC is properly designed, the friction force is sufficient to lock the gear, even as torque increases because the higher torque is reflected as a higher tangential load, thus producing a higher radial load, and finally producing a higher frictional load.

The relative tangential load may be applied to the outer shell via an active force, such as a drag band, or a passive force, such as drag from oil shear of the speed gear.

Design of the ORBDC is key to the present invention. Previously known configurations of the ORBDC either utilize no inner shell (by forming ramps directly on the inner shaft) or utilize an inner shell with no hole for an actuation pin to pass through. In one embodiment hereof, the outer shell is instead prevented from moving in relation to the inner shell by a key member which is rotationally fixed to the shaft and thus to the inner shell. This key member is slid into engagement with a notch in the outer shell via movement along the shaft axis, very much like traditional synchronization components are used to lock gears in manual transmissions. U.S. Pat. No. 6,409,001 details such an arrangement.

SUMMARY OF THE INVENTION

The invention concerns controlling the application of the relative tangential load. Control of the load application is accomplished via a movable actuation member positioned integral with the inner and outer shells. When the actuation member is in a position to lock both the inner and outer shells in a selected relative angular position, the ORBDC is in neutral and cannot block relative rotation. When the actuation member is actuated to allow relative rotational motion of the outer shell with respect to the inner shell, the clutch will block and the gear will be locked to the shaft by the clutch.

As an example, when the invention is applied to a dual-clutch powershift transmission, the desired odd or even gear would be blocked via actuation of the appropriate ORBDC. All other corresponding gears (odd or even) would be locked in their neutral position. The opposite gear set (odd or even) would be pre-selected to the appropriate gear and its ORBDC would also be blocked awaiting application of the corresponding main clutch. The remaining gears in this set too would be locked in neutral. Engine power would be transferred through the first selected gear via the first main clutch until the need to shift. At that time, the first and second main clutches would respectively release and clamp, thus transferring power to the second selected gear, which is already pre-selected and locked. At this time, the first gear set would pre-select another gear, and so on.

The movable actuation member used to lock and unlock the inner and outer shells in relative angular position can be designed in many configurations. In its simplest form, it is a pin which extends through the ORBDC radially from the inner shell outward through the outer shell. The pin could fit into a matching hole in both inner and outer shells. When the pin is in place, the shells are locked. When the pin is removed from at least one shell, the shells can rotate relative to each other, and the ORBDC will block. As is obvious, depending on the actuation member design, the inner and outer shell design will also need to be adjusted to accommodate.

The invention is designed to be used with an actuation member which is positioned within the inner power transmission shaft, as opposed to a member that slides along the axis of the shaft. For this reason, the ORBDC in one embodiment hereof includes a hole that passes through both the inner and outer shells. The actuation member hereof passes through this hole and either prevents or allows the outer shell to rotate relative to the inner shell. Given that a gear will ride on the outer diameter of the outer shell, the actuation member cannot protrude above this outer diameter. For this reason, the outer shell has a recessed step to bring it in closer proximity to the inner shell. This reduces the length of the pin, which protects the pin from interference with the gear and also lowers the forces on the pin.

DESCRIPTION OF PREFERRED EMBODIMENTS

Figure 3:
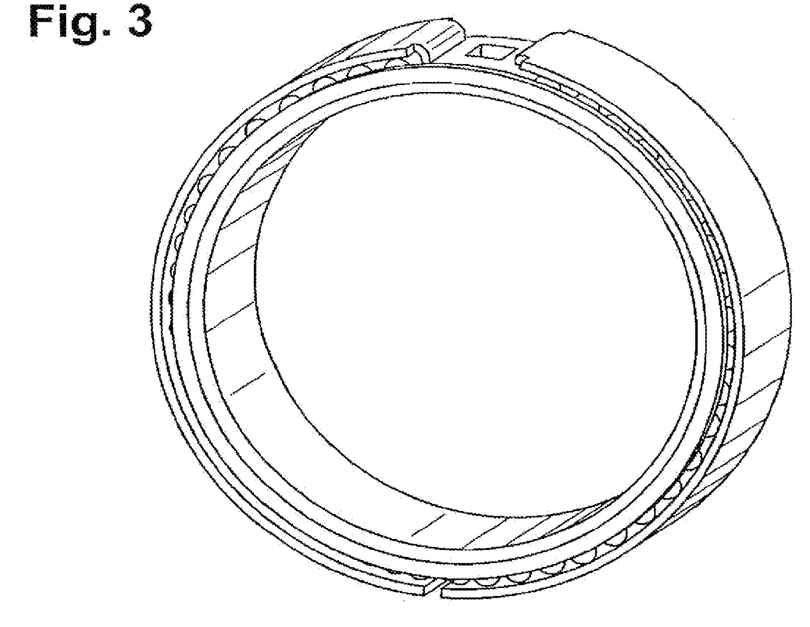
FIG. 3 is a perspective view of an ORBDC.
Figure 4:
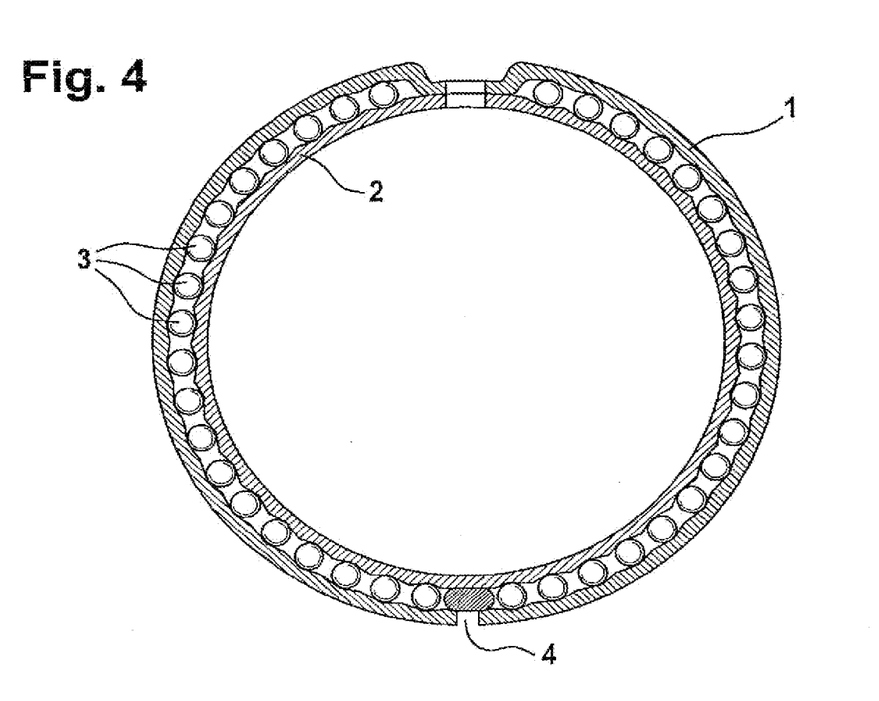
FIG. 4 is a cross-section through the ORBDC of FIG. 3.

Several preferred designs for the actuation member are shown herein:

FIGS. 3 and 4 show basic elements of an ORBDC in which the invention may be embodied. It includes an outer shell 1, inner shell 2 and needle rollers 3 between the shells. The outer shell is split at 4. There may be a notch at the split as described with reference to the embodiment of FIG. 12.

Figure 5:
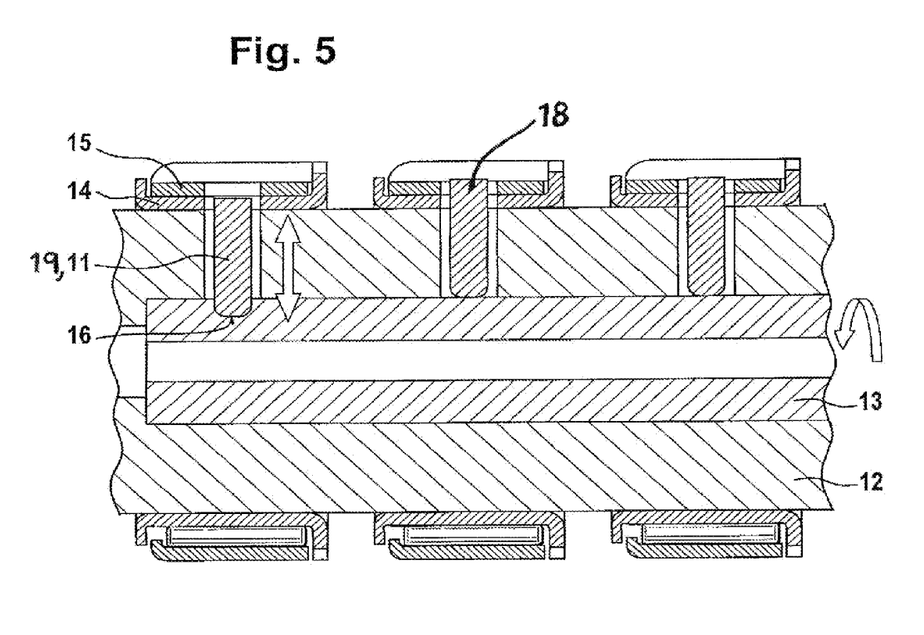
FIG. 5 is a cross-section through one embodiment of the ORBDC.

Referring to the embodiment of FIG. 5, the actuation member is a radially movable pin 11 which is integrated in the inner power transmission shaft 12. An actuation tube 13 internal to the power shaft has a grooved or cammed surface 16 to actuate the pin 11 to either protrude through both of the inner 14 and outer 15 shells as shown by pin 18, or to retract as shown by pin 19 and thus free the outer shell to rotate and block the ORBDC. While an inner shell on a shaft is shown, the surface with ramps which cooperates with the needles may be formed in the shaft itself. Also, the grooves or depressions or ramps may be formed in only one of the shells.

The needles or rollers in all embodiments have a diameter so that they can enter a groove or depression and avoid riding a ramp.

Figure 6:
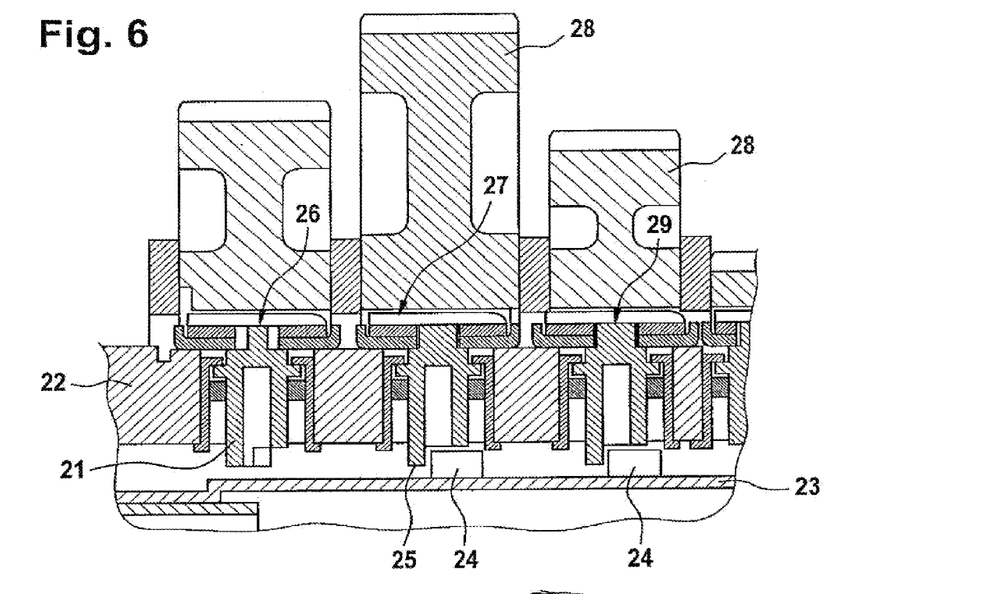
FIG. 6 is a cross-section through a second embodiment of an ORBDC.
Figure 7:
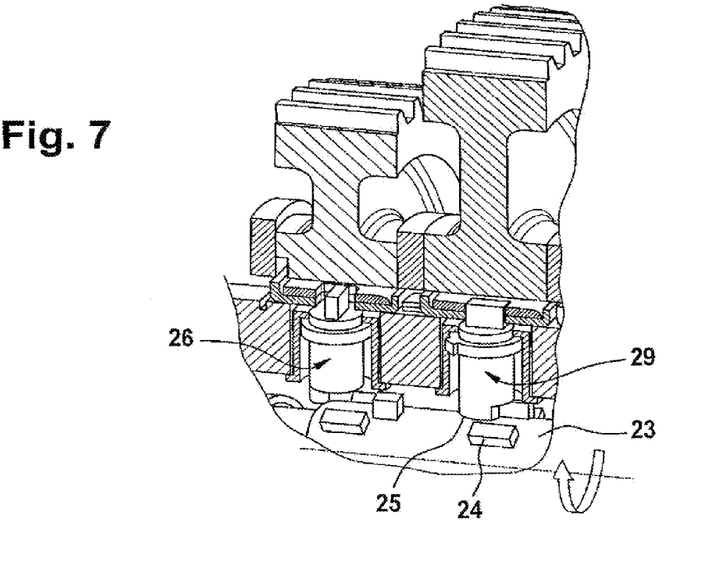
FIG. 7 is a perspective view of the ORBDC in FIG. 6.

Referring to the embodiment of FIGS. 6 and 7, the actuation member is a rotating pin 21 which is integrated in the inner power transmission shaft 22. Shaft 22 is for interconnecting, or transmitting torque between, gears 28 in the transmission. The pin 21 can be actuated, that is, rotated, by various arrangements. The preferred design is a rotating drum 23 with cam lugs 24 thereon that contact the bottom 25 of the pin and rotate the pin. When the pin 21 is in the neutral position shown by pin 26, the ORBDC 27 will be locked from rotation and thus the gear 28 will free spin on the outer shell, and no torque will be transmitted. When the illustrated pin 29 is rotated to the locked position, due to contact between lugs 24 and the respective pin 25, the outer shell of the ORBDC will be free to shift and thus ride the ramps, expand the outer shell, and lock the gear in rotation to the inner power shaft.

Figure 8:
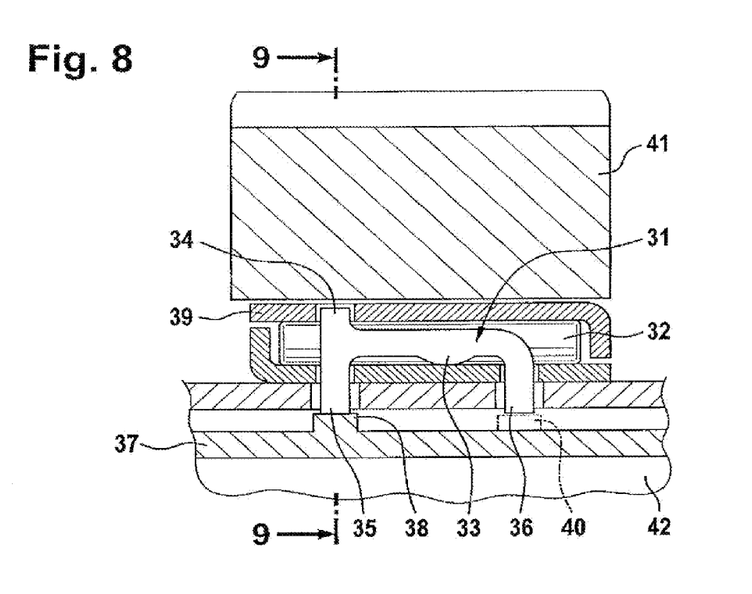
FIG. 8 is a cross-section along the axis showing a third embodiment of the invention.
Figure 9:
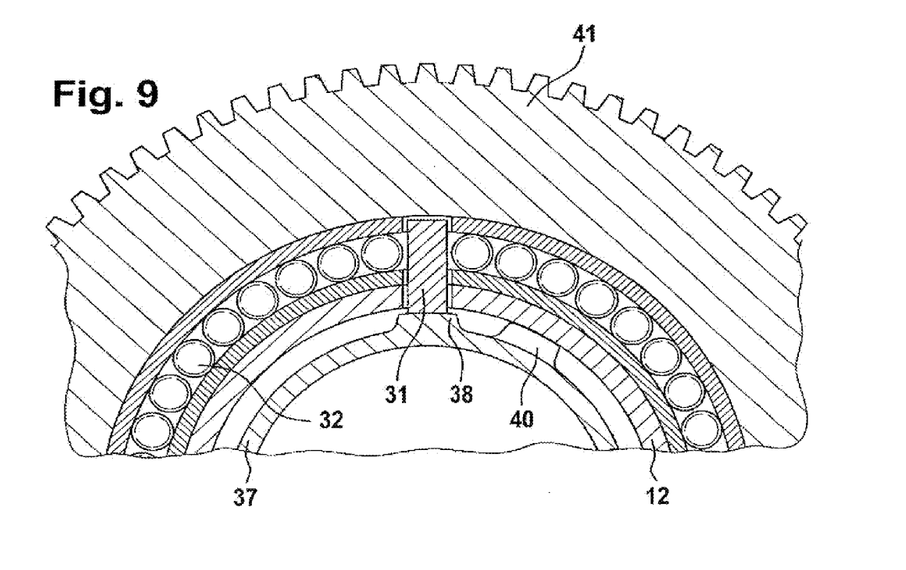
FIG. 9 is a cross-section of the third embodiment across the axis.

Referring to the embodiment of FIGS. 8 and 9, the actuation member is a rocker pin 31 which is installed into the ORBDC at a circumferential location of and in place of one of the needle rollers 32. The rocker pin 31 has a pivot center 33, a lock tab 34, an interlock tab 35, and an engagement tab 36. A selection drum 37 is rotated to transfer between the ORBDC being in its neutral or locking conditions. When the inner selection drum 37 is rotated so that the respective interlock cam 38 on the drum contacts the interlock tab 35, the pin 31 pivots so that the lock tab 34 protrudes through the outer shell 39 of the ORBDC, thus allowing the gear to spin freely over the outer shell. When the selection drum 37 is rotated so that the respective engagement cam 40 on the drum contacts the engagement tab 36, the pin 31 pivots such that the lock tab 34 retracts out of engagement with the outer shell, thus allowing the shell to rotate relatively and lock the gear 41 to the shaft 42.

Figure 10:
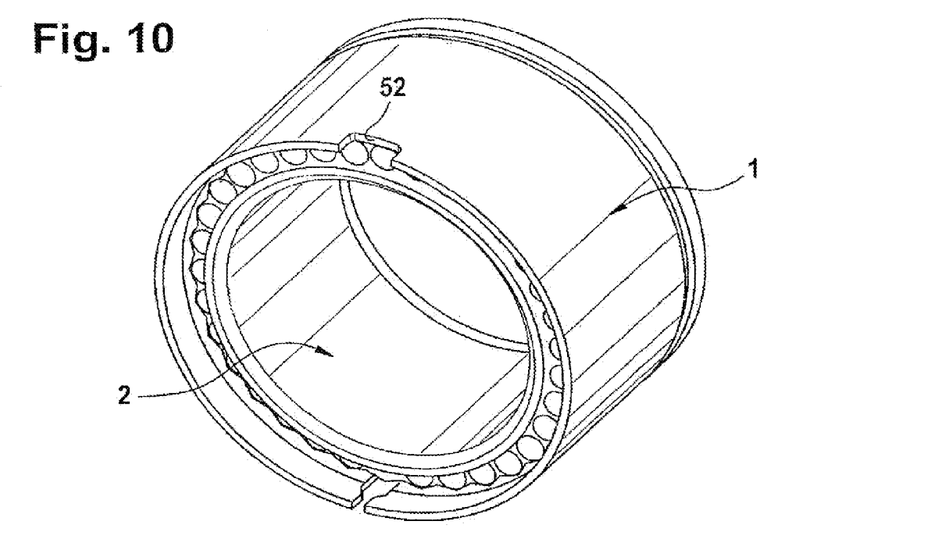
FIG. 10 is an illustrative perspective view of a fourth embodiment of an ORBDC.
Figure 11:
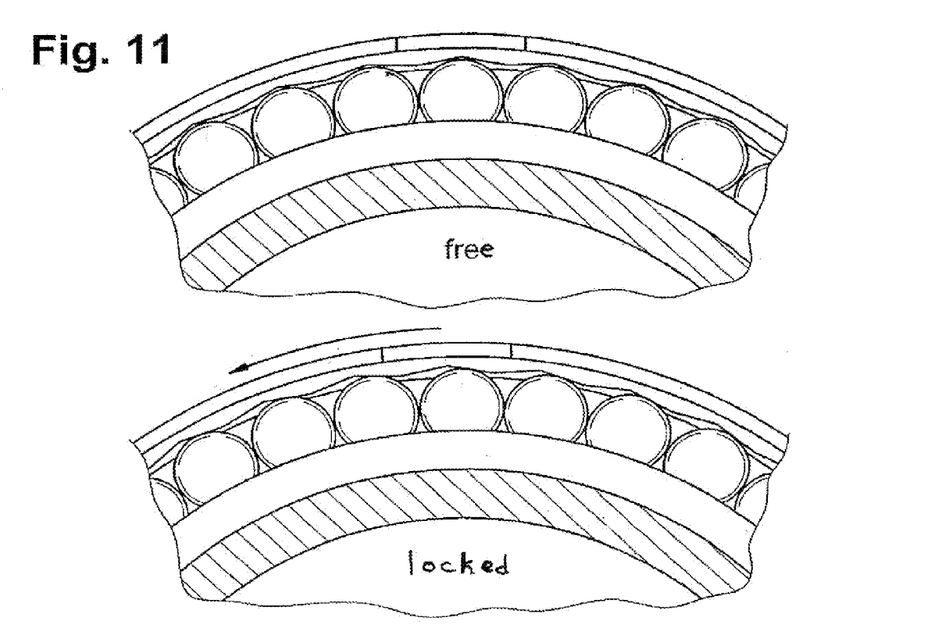
FIG. 11 is an enlarged cross-sectional view showing the ORBDC of FIG. 10 in the free and locked states.

In the embodiment of FIGS. 10 and 11 hereof, the outer shell is instead prevented from moving in relation to the inner shell by a key member (not shown) which is rotationally fixed to the shaft and thus to the inner shell. This key member is slid into engagement with a notch 52 in the outer shell via movement along the shaft axis, very much like traditional synchronization components are used to lock gears in manual transmissions.

Figure 12:
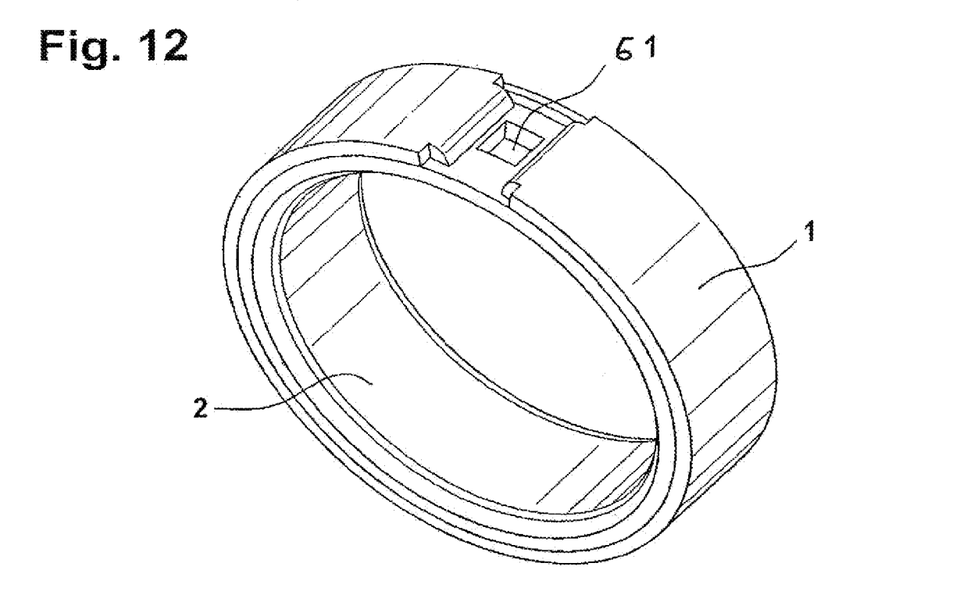
FIG. 12 is a perspective view showing a fifth embodiment of an ORBDC.
Figure 13:
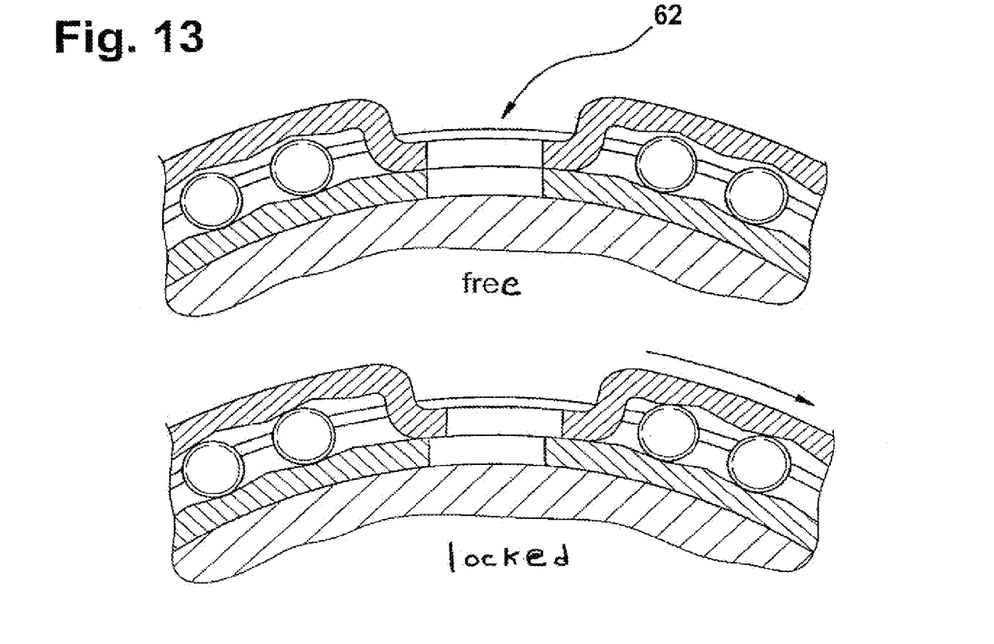
FIG. 13 shows their ORBDC of FIG. 12 in free and locked states.

Referring to FIGS. 12 and 13, the actuation member is positioned within the inner power transmission shaft (not shown) and is not a member that slides along the axis of the shaft. For this reason, the ORBDC in this embodiment hereof includes a hole 61 that passes through both the inner and outer shells. The actuation member hereof (not shown, but from one of the Figures above) passes through the hole 61 and either prevents or allows the outer shell to rotate relative to the inner shell. Because a gear (not shown) will ride on the outer diameter of the outer shell, the actuation member cannot protrude above the outer diameter of the outer shell. For this reason, the outer shell has a recessed step 62 to bring it in closer proximity to the inner shell. This reduces the length of the pin, which protects the pin from interference with the gear and also lowers the forces on the pin. Further, this permits operation of the actuation member within the width of the ORBDC (i.e., between distal ends of the rollers), rather than requiring adding an actuator axially outboard of the outer shell, which would widen ORBDC and possibly the entire system including it.

It is not required that the ORBDC have both an inner and outer shell to make use of the recessed step outer shell in FIG. 10. This can also be used if the inner shell is eliminated via directly forming ramps as described above on the inner shaft. In such a case, the step would come in close proximity with the shaft and still allow actuation from within the shaft without interfering with the gear.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What we claim is:

1. A gear synchronizer comprising:
   a transmission shaft for interconnecting at least two gears in a transmission;
   an overrunning bi-directional clutch including a split outer shell and a plurality of needle rollers with respective distal ends, radially disposed between the outer shell and the transmission shaft;
   an actuator pin extending through the shaft and engageable with the outer shell at a position located axially between two radial planes extending from the needle roller distal ends to limit relative rotation between the outer shell and the transmission shaft; and,
   a rotating drum internal to the power transmission shaft and including cam lugs for rotating the actuator pin,
   wherein the actuator pin includes an axis and is rotated about its axis between a free position for the synchronizer and a locked position for the synchronizer.

2. The gear synchronizer of claim 1 further comprising a gear, wherein the outer shell is arranged to radially expand to facilitate torque transmission between the transmission shaft and the gear.

3. The gear synchronizer of claim 2 wherein the outer shell or the transmission shaft includes a plurality of ramps for receiving the plurality of needle rollers.

4. The gear synchronizer of claim 3 wherein relative rotation between the outer shell and the transmission shaft urges the needle rollers up the ramps to radially expand the outer shell.

5. The gear synchronizer of claim 1 further comprising an inner shell engaged with the transmission shaft, wherein:
   the plurality of needle rollers are radially disposed between the outer shell and the inner shell; and,
   the outer shell or the inner shell includes a plurality of ramps for receiving the plurality of needle rollers.

6. The gear synchronizer of claim 1 wherein the cam lugs contact the bottom of the actuator pin.

* * * * *